United States Patent [19]

Oskamp

[11] Patent Number: 4,934,604

[45] Date of Patent: Jun. 19, 1990

[54] CONTROLLABLE OUTLET NOZZLE FOR PNEUMATIC DOSAGING CONVEYORS

[75] Inventor: Alfons Oskamp, Ahlen, Fed. Rep. of Germany

[73] Assignee: Krupp Polysius AG, Fed. Rep. of Germany

[21] Appl. No.: 125,875

[22] Filed: Nov. 27, 1987

[30] Foreign Application Priority Data

Dec. 5, 1986 [DE] Fed. Rep. of Germany ....... 3641639

[51] Int. Cl.$^5$ .............................. F16K 5/04; B05B 1/30
[52] U.S. Cl. .................... 239/581.1; 251/209; 251/309
[58] Field of Search ............... 251/309, 314, 209, 283; 239/581.1

[56] References Cited

U.S. PATENT DOCUMENTS

| | | | |
|---|---|---|---|
| 351,087 | 10/1886 | Bean | 251/309 X |
| 1,239,870 | 9/1917 | Bradford | 251/309 |
| 3,092,365 | 6/1963 | Knappe | 251/309 |
| 3,093,358 | 6/1963 | Wakeman | 251/309 |
| 3,314,643 | 4/1967 | Sachnik | 251/309 |

FOREIGN PATENT DOCUMENTS

| | | |
|---|---|---|
| 546785 | 3/1932 | Fed. Rep. of Germany. |
| 3437490 | 4/1986 | Fed. Rep. of Germany ...... 251/309 |
| 866313 | 9/1981 | U.S.S.R. .............................. 251/309 |

OTHER PUBLICATIONS

"Material Handling" Rotary feeders Flow-Through Conveying Seals; Sale Brochere, Polysius Co.

*Primary Examiner*—Andres Kashnikow
*Assistant Examiner*—Kevin P. Weldon
*Attorney, Agent, or Firm*—Learman & McCulloch

[57] ABSTRACT

A controllable outlet nozzole for pneumatic dosaging conveyors, comprising dosaging gate valve which is rotatably mounted in a housing and has a recess which runs transversely and eccentrically with respect to the axis of the dosaging gate valve and, depending upon the rotated position of the dosaging gate valve, to a greater or lesser extent exposes a through bore provided in the housing. Such an outlet nozzle is distinguished by a wide control range, reliability in operation, energy-saving functioning and a simple construction.

8 Claims, 1 Drawing Sheet

CONTROLLABLE OUTLET NOZZLE FOR PNEUMATIC DOSAGING CONVEYORS

The invention relates to a controllable outlet nozzle for pneumatic dosaging conveyors for conveying fine material.

BACKGROUND OF THE INVENTION

In the past controllable outlet nozzles constructed as pneumatic constriction nozzles have been used in pneumatic dosaging conveyors for conveying fine material with a high degree of precision. Their control range is very limited at the usual operational gas pressures (about 20%). This control range is not sufficient for many new technological processes (for instance when a plurality of products are to be mixed in a common conveying pipe with a high degree of precision using the smallest possible quantity of gas).

SUMMARY OF THE INVENTION

The object of the invention, therefore, is to develop a controllable outlet nozzle for pneumatic dosaging conveyors for conveying fine material and particularly, a nozzle which is distinguished by a wide control range, low energy consumption, high operational reliability (particularly avoidance of blockages with small throughput quantities) and simple production.

THE DRAWINGS

One embodiment of the invention is illustrated in the drawings, in which.

Figure 1:
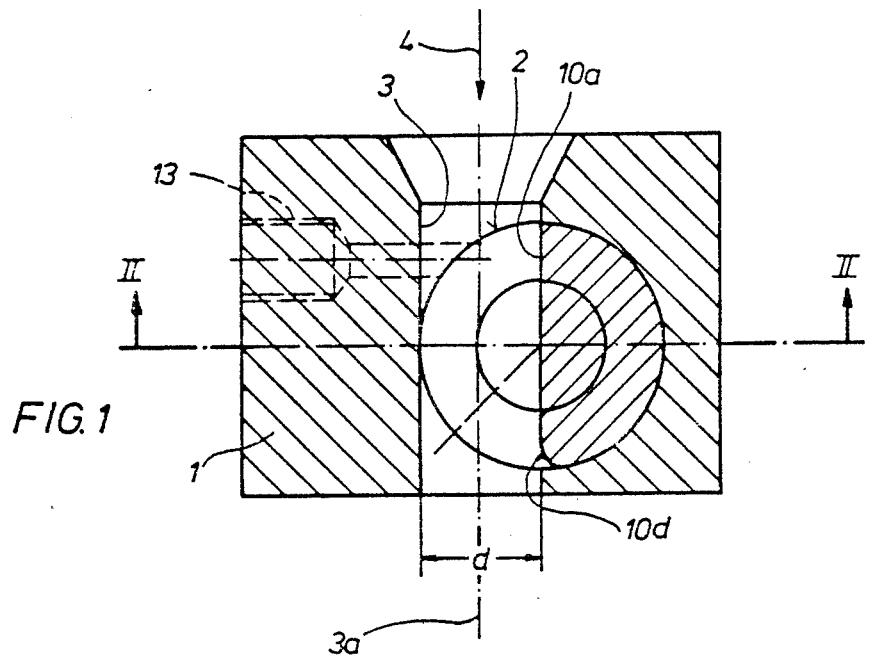
FIG. 1 shows a section through the outlet nozzle along the line I—I in FIG. 2.

The controllable outlet nozzle is intended for a dosaging conveyor for conveying fine material and consists essentially of a housing 1 and a dosaging gate valve 2 which is rotatably mounted in the housing 1.

The housing 1 is provided with a through bore 3 for the pneumatically conveyed fine material (arrow 4). The diameter of the through bore 3 is designated by d.

The housing 1 also contains a bearing bore 5 in which the dosaging gate valve 2 is accomodated. The axis 5a of this bearing bore 5 runs at athwart and intersects the axis 3a of the through bore 3 and is offset by the dimension a with respect to that axis. The dimension a corresponds to the radius d/2 of the through bore 3.

The shaft 2a of the dosaging gate valve 2 is journalled in the housing 1 by means of two ball bearings 6, 7. The driving end of the shaft 2a is guided outwards through a bearing cap 8. On the opposite side the bearing bore 5 is closed by a bearing cap 9.

Figure 2:
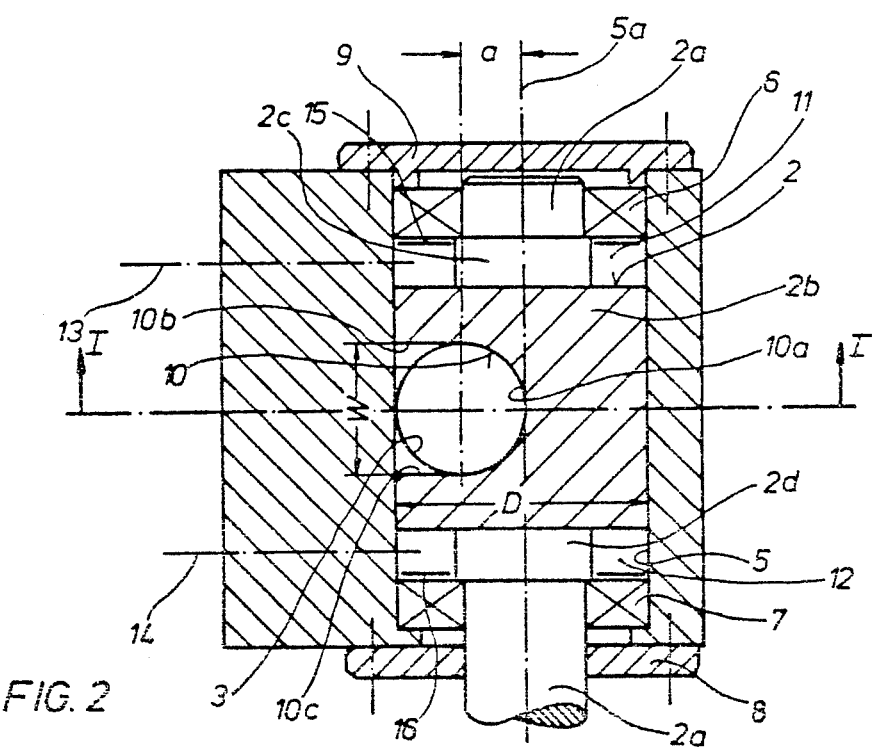
FIG. 2 shows a section through the outlet nozzle along the line II—II in FIG. 1.

The dosaging gate valve 2 is provided with a recess 10 which runs transversely and eccentrically with respect to the dosaging gate valve axis (coinciding with the axis 5a of the bearing bore 5) and which—as can be seen from FIG. 2—has a base 10a located substantially on the axis of the dosaging gate valve 2, the base being flanked by parallel side walls 10b, 10c. Thus the recess 10 has a U-shaped cross-section and is open towards the periphery of the dosaging gate valve.

DETAILED DESCRIPTION

As can be seen from FIG. 2, the width W of the recess 10 corresponds to the diameter d of the through bore 3. Furthermore, the diameter D of the body 2b of the dosaging gate valve 2 containing the recess 2 corresponds to twice the value of the diameter d of the through bore 3.

The recess 10 provided in the dosaging gate valve 2 is therefore arranged and dimensioned so that in one end position of the dosaging gate valve (illustrated by solid lines in FIG. 1) the recess is aligned with the trough bore 3 provided in the housing 1 and thus completely exposes or opens this through bore. On the other hand, in the other end position, offset by 90°, the dosaging gate valve 2 completely shuts off the through bore 3. In an intermediate position which is shown by broken lines in FIG. 1 the dosaging gate valve 2 partially opens the through bore 3.

The edge 10d of the semi-cylindrical base 10a of the recess 10 in the dosaging gate valve which, depending upon the position of the dosaging gate valve 2, opens the through bore 3 in the housing to a greater or lesser extent is slightly rounded (cf. FIG. 1) in order to reduce wear at this point.

The dosaging gate valve is reduced in diameter at opposite ends of the body 2b as shown at 2c and 2d in FIG. 2. This results in the formation of two annular spaces 11 and 12 between the dosaging gate valve 2 and the housing 1, and scavenging air channels 13 and 14 (only indicated by their axes in FIG. 2) provided in the housing 1 open into these annular spaces.

Sealing rings 15, 16 seal the ball bearings 6, 7 against the annular spaces 11 and 12.

The annular space between the housing 1 and the dosaging gate valve 1 is constantly blown through by the scavenging air delivered via the scavenging air channels 13, 14 during the pneumatic conveying of fine material, and this avoids the accumulation of fine material in such channels, thereby preventing such material from compacting the bearings 6 and 7 and causing wear as a result thereof.

The housing is made from high-grade steel and the dosaging gate valve 2 is made from a material which is particularly resistant to wear.

The control or regulation of the nozzle is carried out by moving the dosaging gate valve 2 by means of a standard electric or pneumatic drive (not shown).

By comparison with a known pneumatic constriction nozzle, the controllable outlet nozzle according to the invention has a significantly greater range of control or regulation (0% to 100%). The energy consumption is substantially reduced; also, no additional quantity of gas, such as argon, is needed. Even in a construction with a small diameter, there is no danger of blockage. The production, installation and maintenance of the nozzle is extraordinarily simple.

I claim:

1. A controllable nozzle comprising a housing having a first bore therein through which material may flow, a second bore in said housing extending athwart and intersecting said first bore, a valve having a body occupying said second bore and extending through said first bore, means journaling said valve at its opposite ends in said second bore for rotation of said body about an axis, said body having a recess in its periphery extending transversely and eccentrically of said axis, the angular position of said recess relative to said first bore determining the extent to which said first bore is open, and scavenging air channels in communication with said second bore on opposite sides of said body, each of said channels being in communication with said second bore between said body and the adjacent journalling means.

2. The nozzle according to claim 1 wherein said recess is so positioned and dimensioned that in one extreme angular position of said body said recess completely opens said first bore, whereas in the opposite extreme angular position said body completely closes said first bore.

3. The nozzle according to claim 2 wherein the extreme positions of said body are angularly offset by substantially 90°.

4. The nozzle according to claim 1 wherein said body has an external diameter corresponding substantially to twice that of the first bore, said axis being eccentrically offset by an amount corresponding substantially to the radius of said first bore.

5. The nozzle according to claim 4 wherein said recess is semi-cylindrical and has its base located substantially on said axis, said base being flanked by adjoining side walls.

6. An outlet nozzle according to claim 5 wherein one of said side walls is rounded at one edge thereof.

7. The nozzle according to claim 1 wherein said recess is located between the ends of said body, said body being substantially cylindrical and having reduced diameter ends, said scavenging air channels being in communication with said second bore adjacent the reduced diameter ends of said body.

8. The nozzle according to claim 7 wherein said journalling mans includes two spaced apart, outer bearings adjacent opposite ends of said housing, and a sealing ring carried by each reduced end of said body inwardly of each of said bearings.

* * * * *